(12) United States Patent
Tolt et al.

(10) Patent No.: US 7,070,651 B1
(45) Date of Patent: Jul. 4, 2006

(54) PROCESS FOR GROWING A CARBON FILM

(75) Inventors: Zhidan Li Tolt, Austin, TX (US); Zvi Yaniv, Bloomfield Hills, MI (US); Richard Lee Fink, Austin, TX (US)

(73) Assignee: SI Diamond Technology, Inc., Austin, TX (US)

( * ) Notice: Subject to any disclaimer, the term of this patent is extended or adjusted under 35 U.S.C. 154(b) by 843 days.

(21) Appl. No.: 08/859,960

(22) Filed: May 21, 1997

(51) Int. Cl.
*C30B 29/04* (2006.01)

(52) U.S. Cl. .............................. 117/90; 117/94; 117/95; 117/97; 117/929

(58) Field of Classification Search ................. 117/929, 117/90, 95, 97, 94
See application file for complete search history.

(56) References Cited

U.S. PATENT DOCUMENTS

| | | | | |
|---|---|---|---|---|
| 5,576,051 A | * | 11/1996 | Takeda et al. | 427/77 |
| 5,628,659 A | * | 5/1997 | Xie et al. | 445/3 |
| 5,696,385 A | * | 12/1997 | Song et al. | 257/10 |
| 5,698,328 A | * | 12/1997 | Bunshah et al. | 428/408 |
| 5,759,080 A | * | 6/1998 | Yoshioka et al. | 445/51 |

FOREIGN PATENT DOCUMENTS

| | | |
|---|---|---|
| EP | 0 675 519 A1 | 10/1995 |
| JP | 06092791 | 4/1994 |
| JP | 09063460 | 3/1997 |

OTHER PUBLICATIONS

T.K. Ku et al., "Enhanced electron emission from phosphorus–and boron–doped diamond–clad Si field emitter arrays," *Thin Solid Films*, 1996, pp. 176–180.

Mi–Young Jung et al., "Fabrication of a nanosize Si–tip coated with a thin diamond–like carbon film," *Thin Solid Films*, 1997, pp. 157–159.

* cited by examiner

*Primary Examiner*—Robert Kunemund
(74) *Attorney, Agent, or Firm*—Kelly K. Kordzik; Winstead Sechrest & Minick P.C.

(57) ABSTRACT

A film (carbon and/or diamond) for a field emitter device, which may be utilized within a computer display, is produced by a process utilizing etching of a substrate and then depositing the film. The etching step creates nucleation sites on the substrate for the film deposition process. With this process patterning of the emitting film is avoided. A field emitter device can be manufactured with such a film.

26 Claims, 10 Drawing Sheets

PROCESS FOR GROWING A CARBON FILM

CROSS-REFERENCE TO RELATED APPLICATION

This application for patent is related to U.S. patent application Ser. No. 08/859,692 entitled "A Field Emission Device," which has been filed concurrently herewith.

TECHNICAL FIELD

The present invention relates in general to growing carbon films, and in particular, to growing a carbon film on a treated substrate.

BACKGROUND INFORMATION

Field emission display devices show promise in providing a low cost alternative to LCD displays, especially with respect to laptop computers. Furthermore, field emission devices are beginning to be practically applied in other areas, such as billboard-type display devices.

One of the challenges in producing a good field emission device or display is the manufacture of a field emitter material, which is inexpensive to manufacture yet efficient with respect to power consumption and consistent in its display characteristics. Carbon and/or diamond field emitter materials have shown promise in meeting such constraints.

One of the problems with present methods for depositing such films for use in a matrix addressable display is that in order to pattern the film these processes utilize one or more treatment (e.g., etching) steps after a film has already been deposited on the substrate. Such treatment steps degrade the film's performance and emission capabilities, often to the point where the film emissions are inadequate. As a result, there is a need in the art for a deposition process whereby post-deposition processes performed on the film are not utilized.

SUMMARY OF THE INVENTION

The foregoing need is addressed by the present invention, which utilizes a process whereby a patterned cathode is produced without processing (e.g., etching) the emission film. This is accomplished by performing a treating step on the substrate prior to deposition, which may be comprised of a ceramic material such as fosterite. This treating step may be performed to etch a metal layer that has been previously deposited on the substrate in order to pattern the metal material. After the treating step, then the film is deposited over the entire sample. The number of nucleation sites is greater at the locations where there is no metal resulting in preferential emissions at the sites.

In an alternative embodiment, the material is deposited through a mask whereby the holes in the mask correspond to the areas where the metal layer has been etched away.

In one embodiment, the film deposited, or grown, on the substrate is a diamond or diamond-like film.

In another embodiment of the present invention, the film deposited, or grown, on the substrate is a carbon which is a mixture of diamond particles and graphite particles and amorphus carbon or a subset of this mixture whereby one or more of these materials is present. Such particles may be crystalline.

In another alternative embodiment of the present invention, the film is grown on a substrate after the substrate has been treated with either a base (pH>7) or an acid (pH<7). The substrate may be a ceramic or glass-like material, and may be polished or unpolished previous to the treating step. The treatment, or etching, of the substrate changes the micro-morphology of the substrate (i.e., it "roughens" the surface of the substrate) thus providing a preferential surface for the film to be grown.

In yet another alternative embodiment of the present invention, a sonication process on the treated substrate may be employed to further enhance the growth of the film on the substrate.

In yet another alternative embodiment of the present invention, the substrate may be comprised of a metal, or conductive, material.

An advantage of the present invention is that the film grown on the treated portion of the substrate is a better electron emitting material than the film grown on the untreated portion of the substrate. The result of this advantage is that a pattern can be easily formed of the emission sites without having to perform any type of etching steps after the film has already been grown, or deposited.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIGS. 1–7, there is illustrated a process for producing a film for a field emission device in accordance with the present invention. In step 701, a substrate 101, which may be comprised of glass, a ceramic, or fosterite, a metal (or any other suitable material) is cleaned and then coated (step 702) with 1400 angstroms of titanium (Ti) by electron-beam (e-beam) evaporation. Thereafter, 2000 angstroms of titanium-tungsten (TiW) is deposited onto the sample by a sputtering process. Note, however, that any process for depositing a metal layer 102 on a substrate 101 may be utilized.

Thereafter, in step 703, the metal layer 102 is patterned in a desired manner using photolithography. A photoresist layer 201 is deposited on the metal layer 102 and then patterned using well-known techniques. As illustrated in FIGS. 1–6, the pattern may be an array of open windows developed in the photoresist film. However, please note that any pattern design may be employed.

Figure 1:
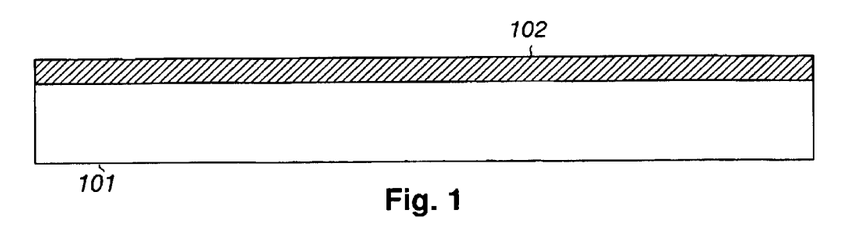
FIGS. 1–6 illustrate a deposition process in accordance with the present invention.
Figure 2:
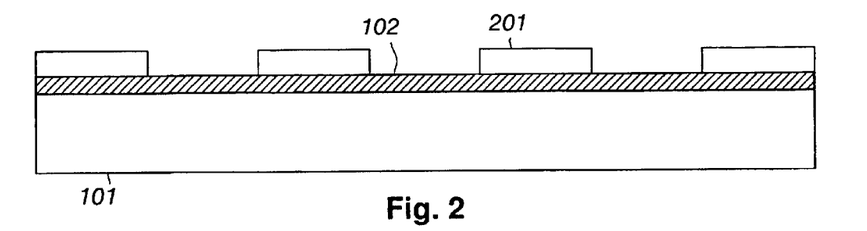
Figure 3:
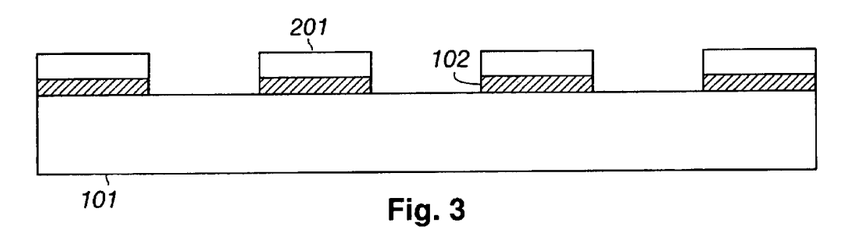
Figure 4:
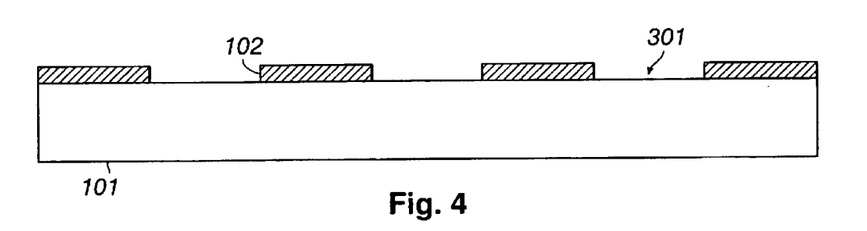
Figure 7:
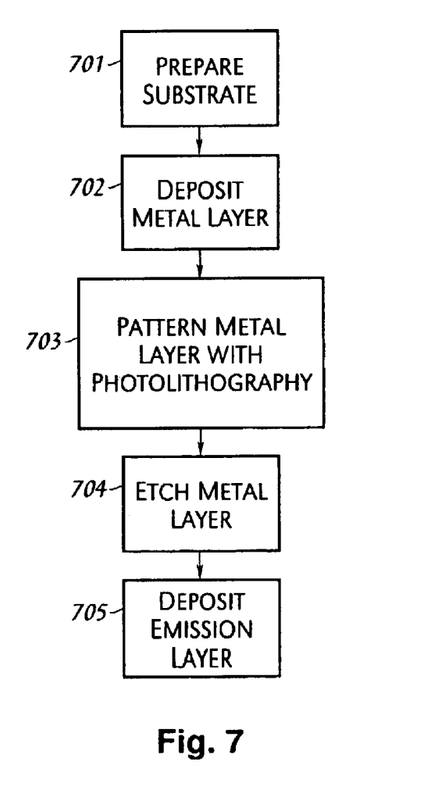
FIG. 7 illustrates a flow diagram in accordance with the present invention.

Next, in step 704, the metal layer 102 is etched, resulting in windows 301 within the metal layer 102. The photoresist layer 201 can then be removed using well-known techniques. The etching step 704 may be performed with seven minutes of a tungsten etchant and then 20–30 seconds of a titanium etchant. Other well-known etchants may be utilized for step 704. The etching process is performed for a sufficient amount of time so that these etchants roughen the surface of the substrate 101. The etchant used to remove the metal layer 102 also attacks the substrate 101. Because the substrate 101 is not perfectly uniform, the etchant attacks some areas of the substrate 101 stronger than other areas. This leaves the surface of the substrate 101 pitted and rough. Surface treatments by acids and bases may also change the chemical composition of the substrate surface as well as change the morphology. For example, certain treatments may leave the surface of a substrate terminated with bonds to hydrogen or fluorine atoms. If the substrate is a composition of different materials, the treatment may result in leaving the surface with a different composition than the bulk material of the substrate. Because, the CVD growth process often involves chemical reactions with the substrate surface, treatments that change the chemical composition of the substrate surface may result in a surface that initiates film growth more favorably than an untreated surface.

Step 704 may or may not involve a sonication step, whereby the sample is emersed in a diamond slurry and sonicated. An advantage to not performing the sonication step is that sonication processes in a diamond slurry can damage metal feedline patterns on the substrate 101 as well as add time and expense in manufacturing a cathode. Furthermore, the sonication step is not easily discriminating as to which areas are treated.

The result of these steps is a sample that has a substrate with a metal film grid pattern coated on one side. Inside the windows 301 of the grid is an etch-treated substrate 101.

The sample is then subjected to a CVD (chemical vapor deposition) carbon film growth process in step 705. Both the treated 301 and the untreated metal coated area 102 are equally exposed to the CVD active gas species (see FIG. 5). The film prefers to nucleate on a defect (i.e., the film preferentially grows on the treated area). Such defects within the substrate 101 have been previously caused by the roughening of the surface of the substrate 101 during the etching step. This etching step causes many tiny defects in the surface of the substrate 101, which provides nucleation sites for grains. As a result, the etching step 704 increases the number of nucleation sites for the deposition of the layer in step 705. Therefore, the resultant layer 501 emits from the windows 301 and not from the areas above the metal layer 102 (the emission site density on the treated area is more than an order of magnitude higher than on the metal (untreated) area). This is because there is an enhanced growth of the film due to the enhanced nucleation. The present understanding of the technology is that emission takes place from diamond nucleation sites that have small grains of diamond. Depositing longer to create more nucleation sites only results in larger grains, not more of them. Thus, areas of higher nucleation density will also be areas of higher emission site density. Furthermore, the extraction field for the film in the window is made lower than that on the metal layer. The emission site density on the window is also at least one order of magnitude higher and as a result, the film on the window area emits preferentially.

The deposition process of step 705 may be performed using a chemical vapor deposition process, which may be assisted with a hot-filament process. This deposition process may result in the growing of a carbon film on the sample.

As can be noted, an advantage of this process is that microelectronics type processing, such as the etching steps, need not be performed subsequent to deposition of a carbon layer, so that the carbon layer is not subject to such processes. This results in a better emitting film and damage to the emitting film is prevented.

Figure 5:
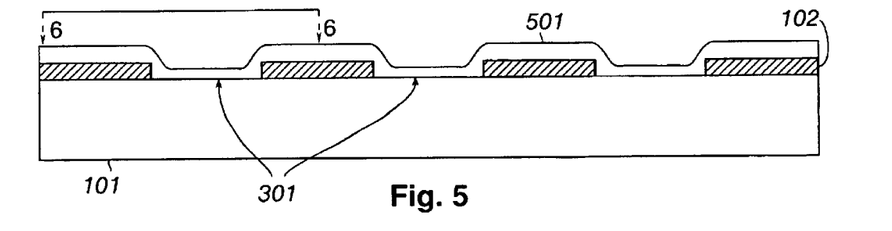
Figure 6:
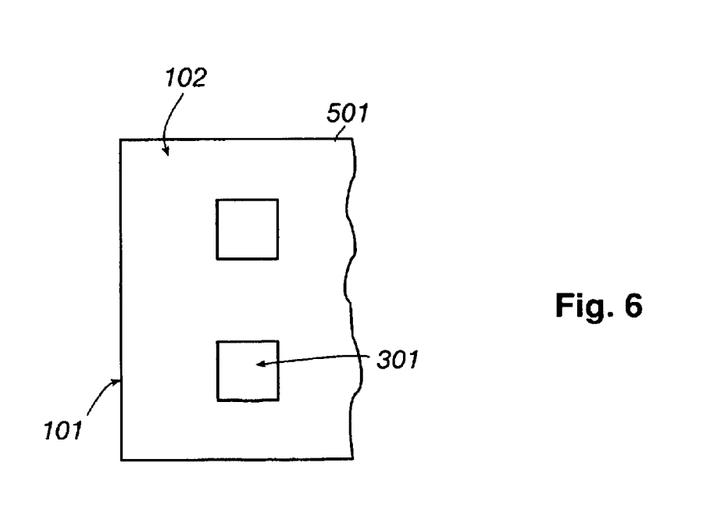

Referring next to FIG. 6, there is illustrated a top view of the portion of the sample illustrated in FIG. 5. As can be seen, emission sites are located at windows 301, and the metal layer 102 surrounds each of these windows 301. A matrix-addressable display can be manufactured whereby windows 301 aligned in a vertical row may all correspond to each other whereby each such row is energized by the metal layer 102 corresponding to that row, and the metal strips 102 are individually addressed.

Figure 10:
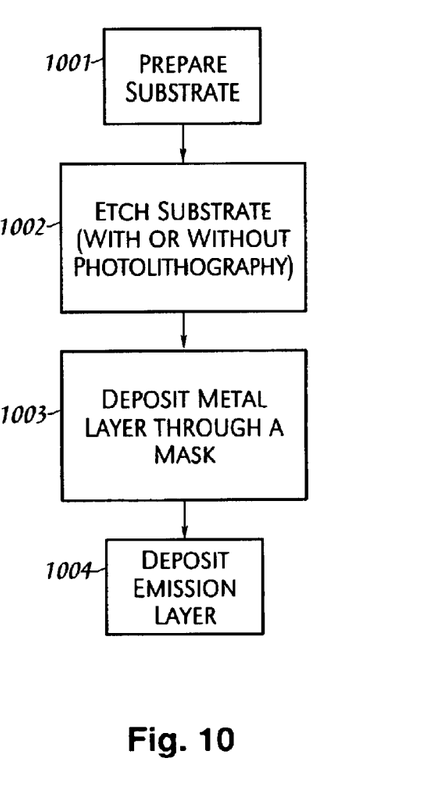
FIG. 10 illustrates a flow diagram of an alternative process for producing a film in accordance with the present invention.

Referring next to FIG. 10, there is illustrated an alternative process for depositing a film, whereby the substrate 101 is prepared in the same manner in step 1001 as in step 701. However, the treating and metal layer deposition steps are reversed from that described above with respect to FIG. 7. In step 1002, the substrate 101 is treated (e.g., etched). This may be performed with or without a photolithography process. If a photolithography process is utilized, then a photoresist pattern may be deposited on the substrate so that the etching step only etches at locations 301. Thereafter, in step 1003, the metal layer is deposited through a mask whereby holes in the mask correspond to all portions of the sample besides the windows 301 so that the resultant metalization pattern is achieved as in FIG. 5. After step 1003, the layer 501 is deposited in step 1004.

Optionally, step 1003 may be deleted. Furthermore, optionally, step 1003 may be performed using a standard photolithography process.

Figure 8:
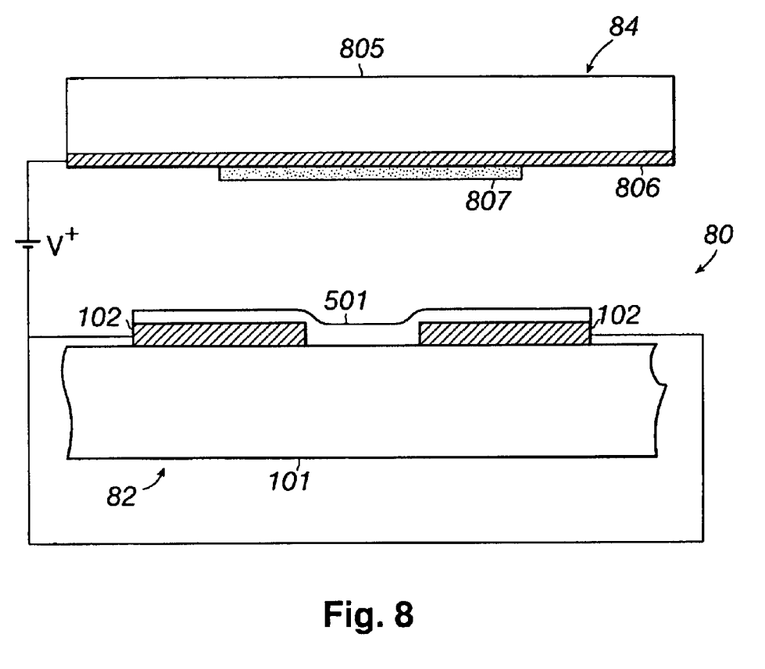
FIG. 8 illustrates a field emission device manufactured with a film in accordance with the present invention.

Referring next to FIG. 8, there is illustrated field emitter device 80 configured with a film produced by either of the processes illustrated in FIGS. 7 and 10. Device 80 could be utilized as a pixel within a display device, such as within display 938 described below with respect to FIG. 9.

Device 80 also includes anode 84, which may comprise any well-known structure. Illustrated is anode 84 having a substrate 805, with a conductive strip 806 deposited thereon. Then, phosphor layer 807 is placed upon conductive film 806. An electrical potential V+ is applied between anode 84 and cathode 82 as shown to produce an electric field, which will cause electrons to emit from film 501 towards phosphor layer 807, which will result in the production of photons through glass substrate 805. Note that an alternative embodiment might include a conductive layer deposited between film 501 and substrate 101. A further alternative embodiment may include one or more gate electrodes (not shown).

The gap between anode 84 and cathode 82 may be 0.75 millimeters (750 microns).

Figure 11:
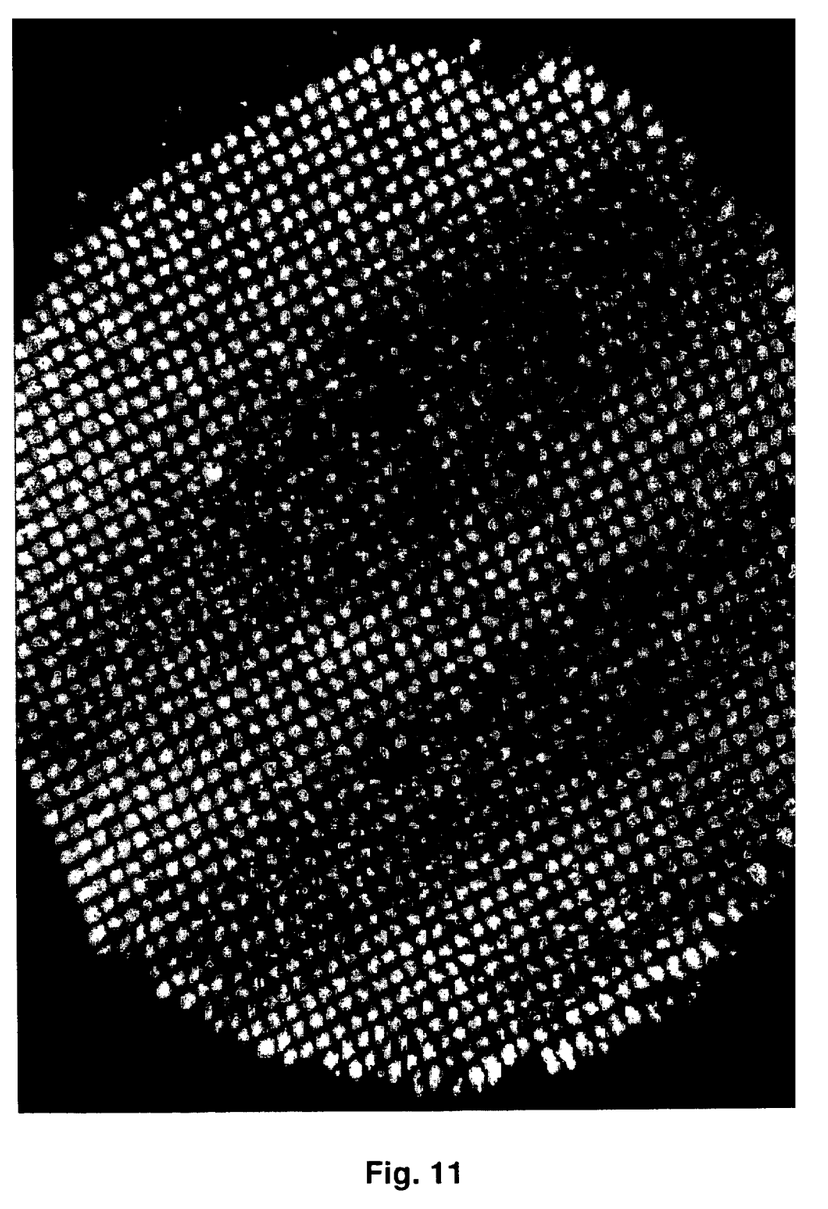
FIGS. 11–14 illustrate images of emission from a cathode manufactured in accordance with the present invention.
Figure 12:
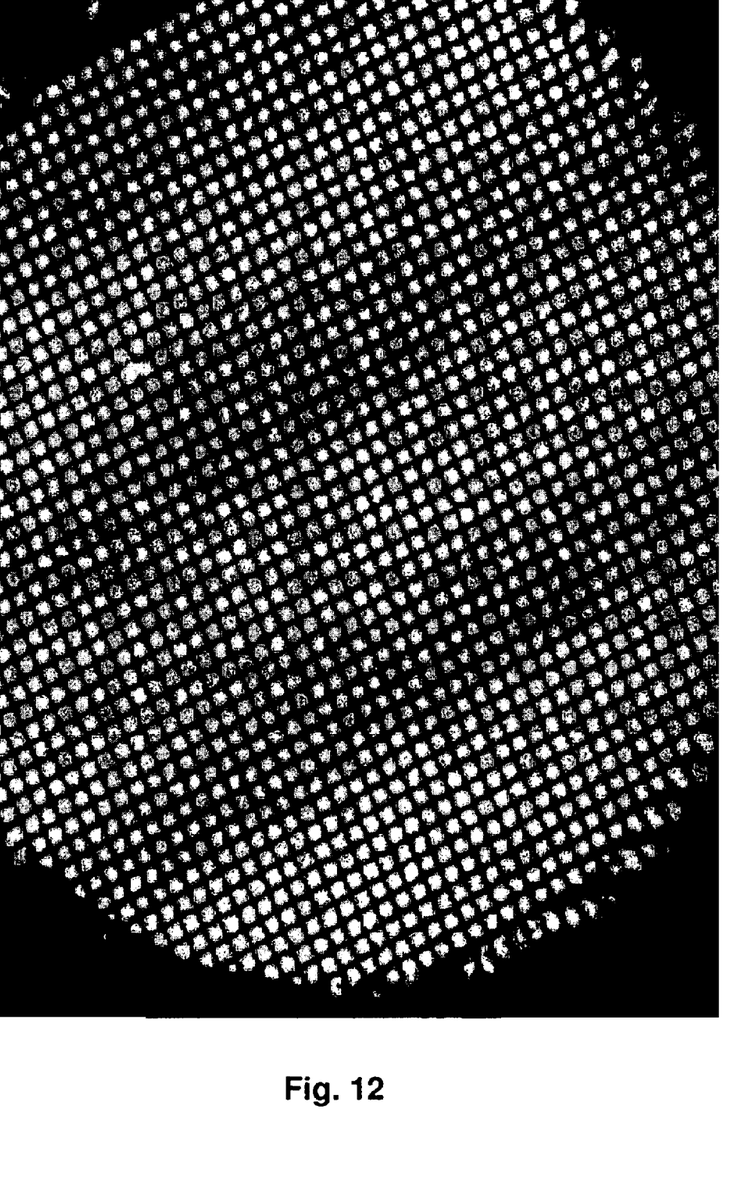
Figure 13:
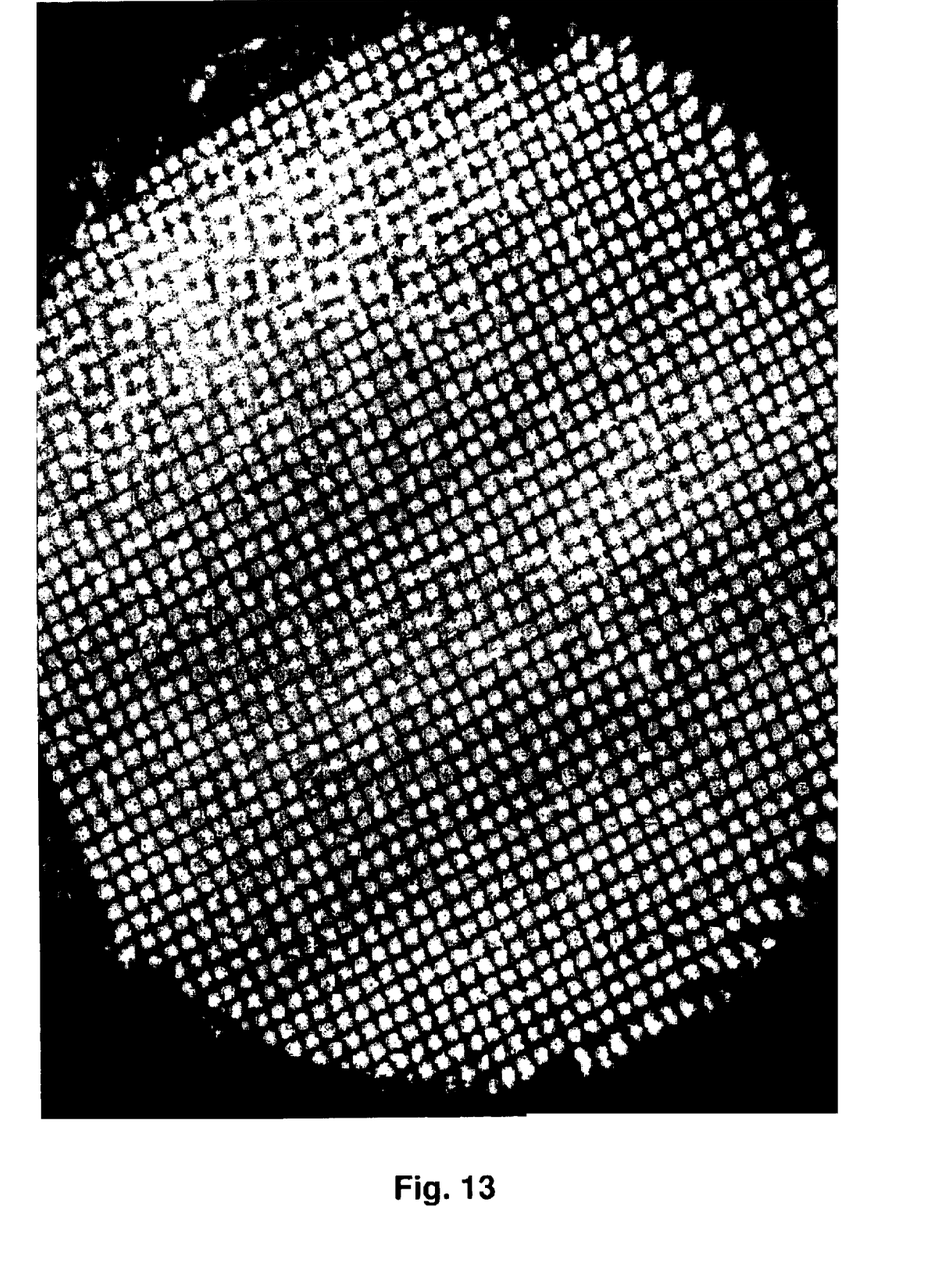

Referring next to FIGS. 11–13, there are shown actual images of photon emission from device 80 taken with different applied voltages, and hence, different applied fields between the anode 84 and the cathode 82. The images in FIGS. 11–13 were taken by applying a pulsed foltage at 1000 Hz frequency with a 10 microsecond pulse width. The gap between anode and cathode was 0.75 mm. In FIG. 11, the peak emission current was 4mA with an applied voltage of 3230 volts. In FIG. 12, the peak emission current was 40 mA with an applied voltage of 4990 volts. In FIG. 13, the peak emission current was 20 mA with an applied voltage of 3720 volts. As can be readily seen, light is generated in the phosphor screen 84 only in the areas where electrons from the cathode 82 strike the phosphor 807. It is seen in FIGS. 11–13 that the area of the substrate 101 that was subjected to the etching process is the area from where electron emission occurs.

Figure 14:
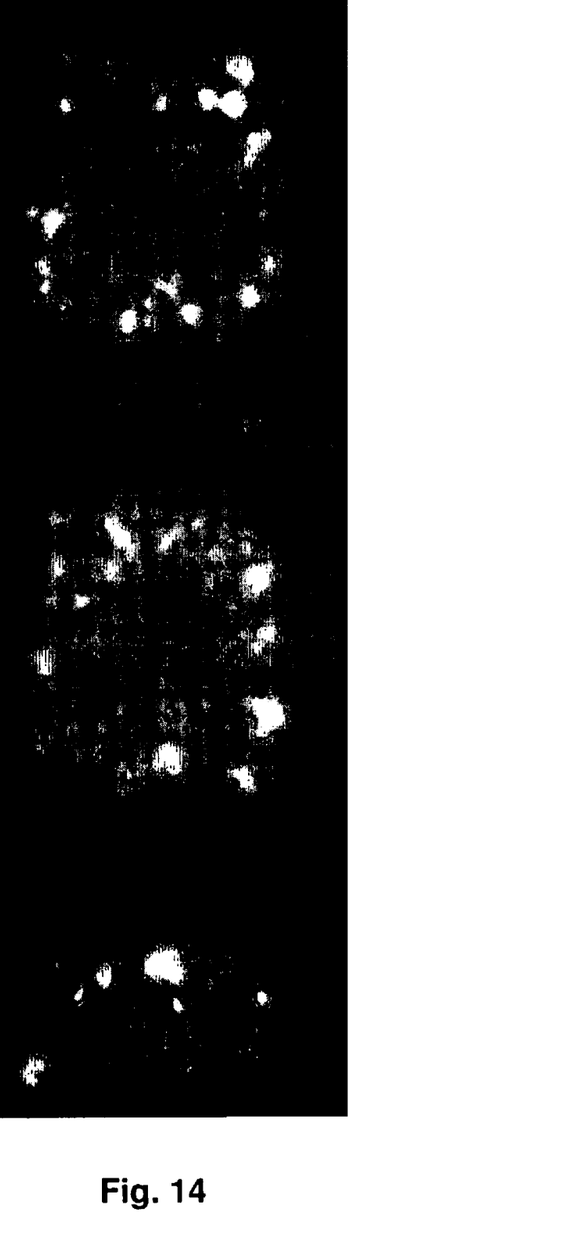

FIG. 14 shows a similar actual image from a similar test except that the gap between the anode 84 and cathode 82 is much smaller (43 microns) and the camera set-up to take this image provided a higher resolution image. Again, one can see from the lighted areas of the phosphor that the area on the cathode 82 that was subjected to the etching process is the area from where almost all the electron emission occurs.

Because the emission sites from the etched area dominate the emission properties on this particular sample, it is not possible to get a direct measure of emission properties of the untreated area directly. As a result, in order to compare experimentally the emission properties between an etched area and an unetched area, another sample, which was not treated to the etching step wherein the metal layer was left intact, was produced and a carbon film was grown on top of the metal layer with the same CVD process that was used to grow the carbon film on the pattern sample illustrated above in FIGS. 11–14.

Figure 15:
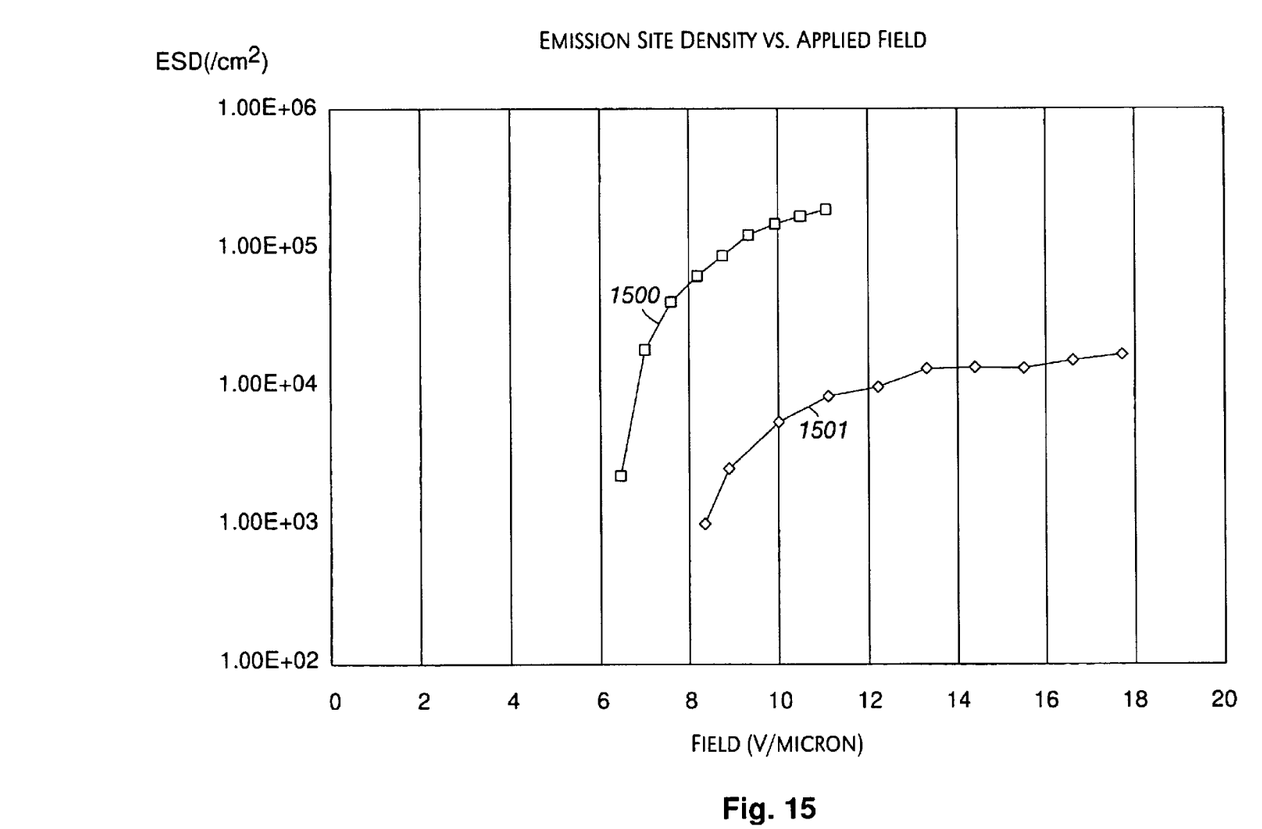
FIGS. 15 and 16 illustrate graphs showing the disparity in emission properties between a film grown on a treated substrate and a film grown on an untreated substrate.

FIG. 15 illustrates a comparison of the emission site density between the treated and untreated areas as a function of the applied field. The treated, or etched area had the emission properties illustrated by line 1500, while the unetched area had emission properties as shown by line 1501.

Figure 16:
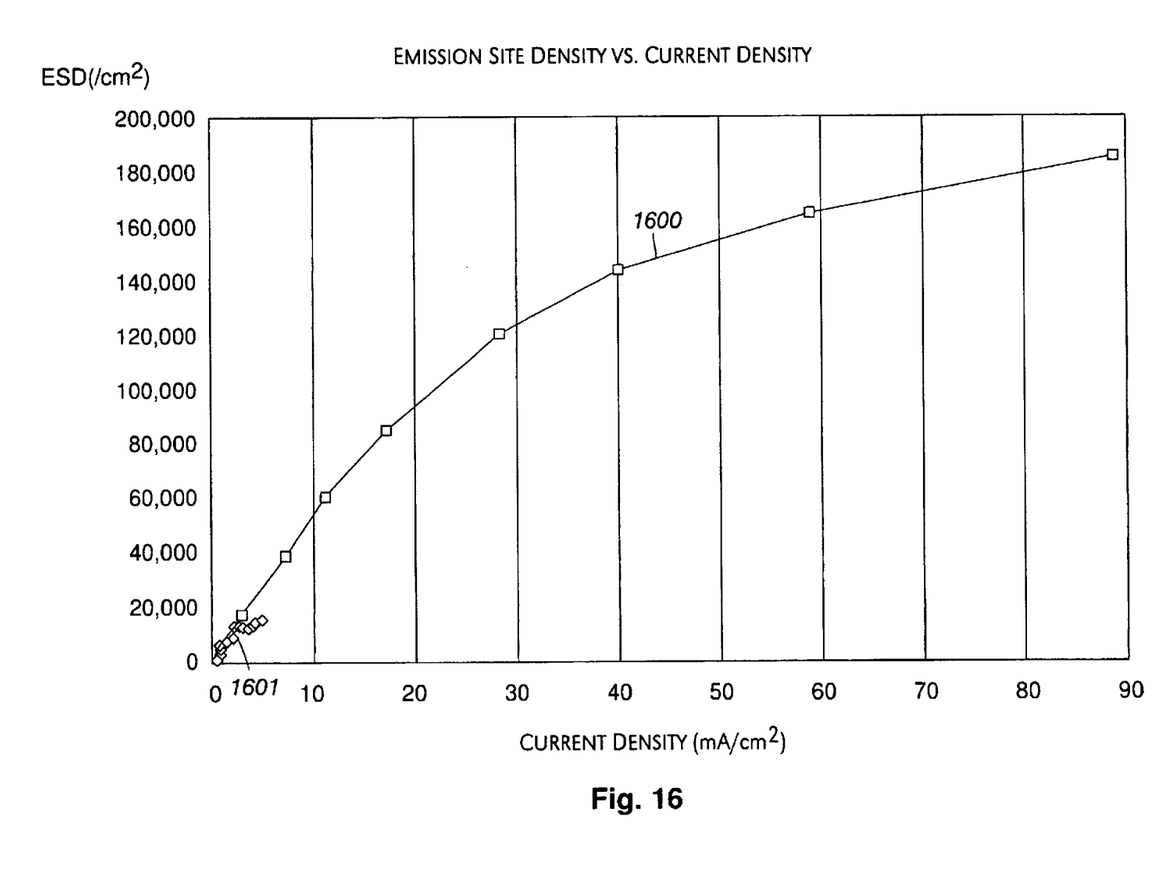

FIG. 16 shows a comparison of the emission site density between treated and untreated areas as a finction of electron emission current density. Again, the treated, or etched area, had such properties as illustrated by line 1600, while the unetched area had the properties illustrated by line 1601.

One can see that the properties of the treated areas are superior to the untreated areas in that they have higher emission site densities at lower extraction fields and achieve overall higher emission site densities. With proper field control, only the treated area has electron emission.

Figure 9:
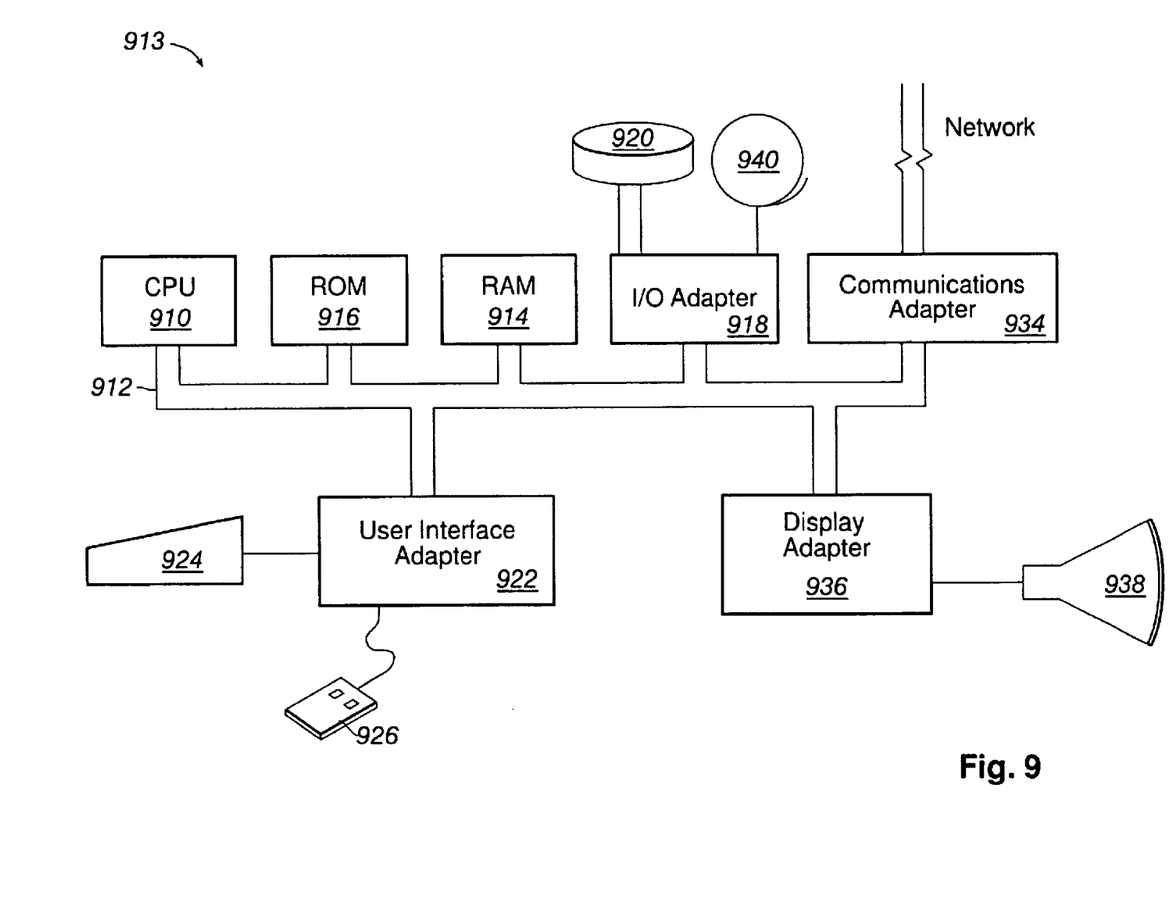
FIG. 9 illustrates a data processing system utilizing a display device manufactured with a field emitter in accordance with the present invention.

As noted above, field emitter device 80 may be utilized within field emission display 938 illustrated in FIG. 9. A representative hardware environment for practicing the present invention is depicted in FIG. 9, which illustrates a typical hardware configuration of workstation 913 in accordance with the subject invention having central processing unit (CPU) 910, such as a conventional microprocessor, and a number of other units interconnected via system bus 912. Workstation 913 includes random access memory (RAM) 914, read only memory (ROM) 916, and input/output (I/O) adapter 918 for connecting peripheral devices such as disk units 920 and tape drives 940 to bus 912, user interface adapter 922 for connecting keyboard 924, mouse 926, speaker 928, microphone 932, and/or other user interface devices such as a touch screen device (not shown) to bus 912, communication adapter 934 for connecting workstation 913 to a data processing network, and display adapter 936 for connecting bus 912 to display device 938. CPU 910 may include other circuitry not shown herein, which will include circuitry commonly found within a microprocessor, e.g., execution unit, bus interface unit, arithmetic logic unit, etc. CPU 910 may also reside on a single integrated circuit.

Although the present invention and its advantages have been described in detail, it should be understood that various changes, substitutions and alterations can be made herein without departing from the spirit and scope of the invention as defined by the appended claims.

What is claimed is:

1. A method for making a field emitter device comprising the steps of:

providing a substrate;

treating said substrate to modify a morphology of said substrate; and growing a carbon film on said treated substrate.

2. The method as recited in claim 1, wherein only a portion of said substrate is subjected to said treating step, and wherein said carbon film grown on said treated substrate is a better field emitter than carbon film grown on an untreated portion of said substrate.

3. The method as recited in claim 2, wherein said carbon film grown on said treated portion of said substrate emits substantially more electrons when subjected to a specified electric field than said carbon film on said untreated substrate.

4. The method as recited in claim 1, wherein said substrate is treated with a base, wherein said treating step changes the chemical composition of said surface of said substrate.

5. The method as recited in claim 1, wherein said substrate is treated with an acid.

6. The method as recited in claim 5, wherein said substrate is a ceramic.

7. The method as recited in claim 5, wherein said substrate is a metal.

8. The method as recited in claim 5, wherein said substrate is a glass.

9. The method as recited in claim 1, further comprising the step of performing sonication on said substrate.

10. The method as recited in claim 3, wherein said substrate was not subjected to a sonication step.

11. The method as recited in claim 1, further comprising the steps of:

depositing a metal layer on said substrate whereby said metal layer has a predefined pattern so that a portion of said substrate is accessible through said metal layer, wherein said depositing step is performed before said growing step.

12. The method as recited in claim 11, wherein said step of growing said carbon film also deposits said carbon film on said metal layer, wherein said carbon film is a continuous film.

13. The method as recited in claim 11, wherein said step of depositing said metal layer on said substrate further comprises the steps of:

depositing said metal layer on said substrate;

patterning said metal layer using photolithography; and etching said metal layer producing said predefined pattern.

14. A field emitter device manufactured by the following steps:

providing a substrate;

treating said substrate to modify a morphology of said substrate; and growing a carbon film on said treated substrate, wherein only a portion of said substrate is subjected to said treating step, and wherein said carbon film grown on said treated substrate is a better field emitter than carbon film grown on an untreated portion of said substrate, wherein said carbon film grown on said treated portion of said substrate emits substantially more electrons when subjected to a specified electric field than said carbon film on said untreated substrate.

15. The device as recited in claim 14, wherein said substrate is treated with an acid.

16. The device as recited in claim 15, wherein said substrate is a ceramic.

17. A method for depositing a carbon film comprising the steps of:

depositing a metal layer on a substrate whereby said metal layer has a predefined pattern so that a portion of said substrate is accessible through said metal layer; and depositing said carbon film on said portion of said substrate.

18. The method as recited in claim 17, wherein said step of depositing said carbon film also deposits said carbon film on said metal layer.

19. The method as recited in claim 18, wherein said carbon film is a continuous film.

20. The method as recited in claim 17, wherein said step of depositing said metal layer on said substrate further comprises the steps of:

depositing said metal layer on said substrate;

patterning said metal layer using photolithography; and etching said metal layer producing said predefined pattern.

21. The method as recited in claim 20, wherein said etching step roughens a surface of said substrate at said portion of said substrate.

22. The method as recited in claim 21, wherein said substrate is a ceramic-like material.

23. The method as recited in claim 17, wherein said step of depositing said metal layer on said substrate further comprises the steps of:

etching said substrate, wherein said etching step changes the chemical composition of said surface of said portion of said substrate; and depositing said metal layer on said substrate through a mask producing said predefined pattern.

24. The method as recited in claim 23, wherein said etching step roughens a surface of said substrate.

25. The method as recited in claim 20, wherein said etching step changes the chemical composition of said surface of said portion of said substrate.

26. A method for making a field emitter device comprising the steps of:

providing a substrate;

treating said substrate to modify (1) a morphology of said substrate, and/or (2) a chemical composition of said substrate; and growing a carbon film on said treated substrate, wherein only a portion of said substrate is subjected to said treating step, and wherein said carbon film grown on said treated substrate is a better field emitter than carbon film grown on an untreated portion of said substrate, wherein said carbon film grown on said treated portion of said substrate emits substantially more electrons when subjected to a specified electric field than said carbon film on said untreated substrate.

* * * * *